United States Patent
Sakamoto

(10) Patent No.: US 7,097,580 B2
(45) Date of Patent: Aug. 29, 2006

(54) SPROCKET FOR A SILENT CHAIN AND METHOD OF MANUFACTURING THE SAME

(75) Inventor: Naoji Sakamoto, Nabari (JP)

(73) Assignee: BorgWarner Morse TEC Japan K.K., Mie (JP)

( * ) Notice: Subject to any disclaimer, the term of this patent is extended or adjusted under 35 U.S.C. 154(b) by 178 days.

(21) Appl. No.: 10/690,342

(22) Filed: Oct. 21, 2003

(65) Prior Publication Data

US 2004/0116224 A1   Jun. 17, 2004

(30) Foreign Application Priority Data

Oct. 25, 2002  (JP) ............................. 2002-310453

(51) Int. Cl.
   *F16H 55/30* (2006.01)
(52) U.S. Cl. ..................................... 474/152
(58) Field of Classification Search ................. 74/460, 74/594.2; 474/152, 162, 164
   See application file for complete search history.

(56) References Cited

U.S. PATENT DOCUMENTS

| | | | | |
|---|---|---|---|---|
| 1,870,801 A | * | 8/1932 | Engstrom | 474/156 |
| 2,179,967 A | * | 11/1939 | Thompson | 74/460 |
| 4,472,164 A | * | 9/1984 | Pusch et al. | 474/161 |
| 5,213,636 A | * | 5/1993 | Akers et al. | 148/573 |
| 5,711,187 A | * | 1/1998 | Cole et al. | 74/434 |
| 5,829,850 A | * | 11/1998 | Ketting et al. | 305/194 |
| 6,071,204 A | * | 6/2000 | Jefferies et al. | 474/161 |
| 6,168,754 B1 | * | 1/2001 | Woolf et al. | 419/28 |
| 6,899,846 B1 | * | 5/2005 | Woolf | 419/28 |
| 2002/0193194 A1 | * | 12/2002 | Okabe | 474/152 |

* cited by examiner

*Primary Examiner*—Vicky A. Johnson
(74) *Attorney, Agent, or Firm*—Brown & Michaels, PC; Greg Dziegielewski

(57) ABSTRACT

A sprocket for preventing the partial wear on the teeth of the sprocket. The teeth of the sprocket comprised of a pair of side portions located on opposite sides of a tooth and a central portion located between the pair of sides. The pair of side portions has a hardness greater than the central portion.

5 Claims, 3 Drawing Sheets

SPROCKET FOR A SILENT CHAIN AND METHOD OF MANUFACTURING THE SAME

REFERENCE TO RELATED APPLICATIONS

This application claims an invention, which was disclosed in Japanese Patent Application Number 2002-310453, filed Oct. 25, 2002, entitled "Sprocket For A Silent Chain And Method Of Manufacturing The Same." The benefit under 35 USC §119 (a)–(d) or 35 USC §365(b) of the Japanese application is hereby claimed, and the aforementioned application is hereby incorporated herein by reference.

BACKGROUND OF THE INVENTION

1. Field of the Invention

The invention pertains to the field of silent chains. More particularly, the invention pertains to an improvement in sprocket structure to decrease partial wear on sprocket teeth.

2. Description of Related Art

A silent chain is used as a power transmission chain for automobiles, motorcycles and the like. A silent chain is generally comprised of a plurality of link plates each having a pair of teeth and pin apertures, arranged in lateral and longitudinal directions, and pivotally connected by connecting pins inserted into the pin apertures.

In prior art FIGS. 4 and 5 illustrate an engaging state of a sprocket tooth with a silent chain. As shown in these drawings, a silent chain 1 is comprised of link rows 4 that are formed of a plurality of link plates 2 and guide rows 5 that are disposed adjacent to the link rows 4 and are formed of a plurality of link plates 2 and outermost guide links 3.

A link plate 2 includes a pair of teeth (not shown) that engage with a sprocket tooth 6. Guide links 3 are provided to maintain the silent chain 1 on the sprocket tooth 6 during engagement and does not include a tooth for engagement with a chain.

In order to smoothly engage the silent chain with a sprocket tooth, a distance W between the inside surfaces of the oppositely disposed guide links 3 is greater than a tooth width T of a sprocket. The difference Δ(=W−T) is a clearance of the silent chain 1.

With regard to the engagement of a guide row 5 with sprocket tooth 6, as shown in FIG. 4, an entire surface of each of the link plates 2 of guide row 5 comes into contact with sprocket tooth 6. In FIG. 4, each hatched portion 6A shows a respective engagement surface of each of the link plates 2 on the sprocket tooth 6. Also, one side surface 60 of the sprocket is in close contact with an inside surface of a guide link 3 and a maximum clearance Δ is formed between the other side surface 60 of the sprocket and an inside surface of the other guide link 3.

With regard to the engagement of a link row 4 with sprocket tooth 6, as shown in FIG. 5, all the link plates 2 except the outermost link plate is in whole-surface contact with sprocket tooth 6. The outermost link plate 2 with clearance Δ relative to the sprocket tooth 6 is in a partial-surface contact with the sprocket tooth 6. In FIG. 5, each hatched portion (6A, 6A') shows a respective engagement surface of each of the link plates 2 on the sprocket tooth 6. The hatched portion 6A is a surface with which a link plate 2 comes into a whole surface contact, whereas the hatched portion 6A' is a surface with which a link plate 2 comes into partial surface contact.

In this case, during operation of a silent chain, the surface pressure caused by the link plate 2 on the sprocket tooth 6 is highest at the hatched, partial contact surface 6A', thereby causing a partial wear on the sprocket tooth surface at the hatched portion 6A'. As the partial wear progresses, the surface pressures of the hatched portions 6A caused by the remaining link plates 2 on the sprocket tooth surface increases. As a result, wear to the whole surface of the sprocket tooth progresses.

The present invention has been made in view of these circumstances and its object is to provide a sprocket for a silent chain that can decrease partial wear to the sprocket tooth.

SUMMARY OF THE INVENTION

The present invention is directed to a sprocket for a silent chain where side portions located on opposite sides of each of the sprocket teeth have a higher hardness than a central portion located in the center of the sprocket teeth.

A method of manufacturing of a sprocket for a silent chain that decreases the partial wear on the sprocket comprises the following steps of a) preparing a sprocket material having a plurality of teeth around its periphery; b) forming protrusions on a pair of side portions located on opposite sides of each of the teeth; and c) forming a tooth surface of each of the teeth of a sprocket by rolling.

In this case, the sprocket's tooth surface is rolled with each of the side portions protruded outwardly, which makes the density of each of the side portions higher than the density of the central portion of the tooth after a rolling process. Thereby, the hardness of the side portions becomes greater than the hardness of the central portion and as a result, a partial wear to the side portions of a sprocket tooth due to a high surface pressure can be prevented.

In an alternative embodiment, the method of manufacturing a sprocket for a silent chain that decreases the partial wear on the sprocket comprises the following steps of a) providing a sintered material of a higher density for the pair of side portions located on opposite sides of each of sprocket teeth and a sintered material of a lower density for the central portion of each of the sprocket teeth; and b) forming a sprocket by sintering the sintered material of a higher and lower density.

In this case, the high density sintered material for each of the side portions is comprised of powdered material having small-sized particles. The low density sintered material for the central portion is comprised of large-sized particles. Thereby, a hardness of the side portions becomes higher than the hardness of the central portion after sintering process and a partial wear to the side portions due to high surface pressure can thus be prevented.

In another alternative embodiment, the method of manufacturing a sprocket for a silent chain that decreases the partial wear on the sprocket comprises the following steps of a) preparing a tooth central portion of a first hardness and a pair of tooth side portions of a second hardness higher than the first hardness; and b) forming a sprocket by integrating the tooth central portion with the tooth side portions.

In this case, since the tooth side portions and the tooth central portion are composed from discrete members, it becomes easy to provide a difference in hardness between the first hardness of the tooth central portion and the second hardness of the tooth side portions. Riveting, bolting, or the like integrates each of the tooth side portions with the tooth central portions.

Each of the side portions of a sprocket tooth may have a width generally equal to a thickness of an outermost link plate composing link rows of a silent chain because a link plate's thickness is sufficient for a width of an engagement surface of an outermost link plate

DETAILED DESCRIPTION OF THE INVENTION

Figure 1:
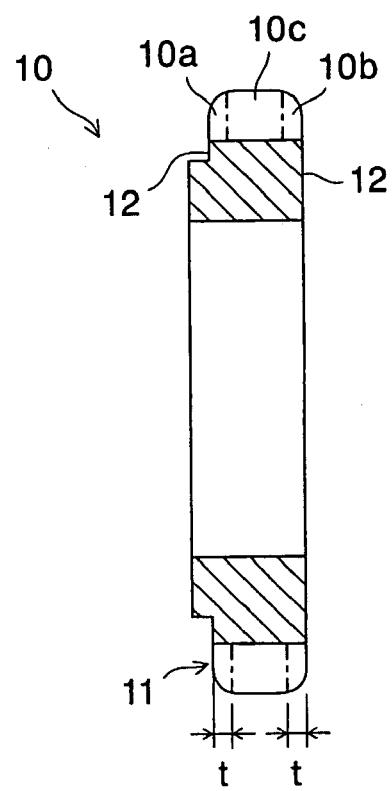
FIG. 1 is a side sectional view of a sprocket for a silent chain according to a first embodiment of the present invention.

FIG. 1 shows a side section of a sprocket for a silent chain according to an embodiment of the present invention. As shown in FIG. 1, tooth 11 of a sprocket 10 includes a pair of side portions 10a, 10b located on opposite sides 12 of the tooth 11 and a central portion 10c located in the center of the tooth 11. The side portions 10a, 10b and the central portion 10c are formed integrally with each other.

Preferably, a thickness t of each of the side portions 10a, 10b is generally equal to the thickness of an outermost link plate composing the link rows of a silent chain. Also, the hardness of each of the side portions 10a, 10b is higher than the hardness of the central portion 10c. The difference in hardness between the side portions 10a, 10b and the central portion 10c is preferably at least 5 units on a Rockwell Hardness scale.

Figure 5:
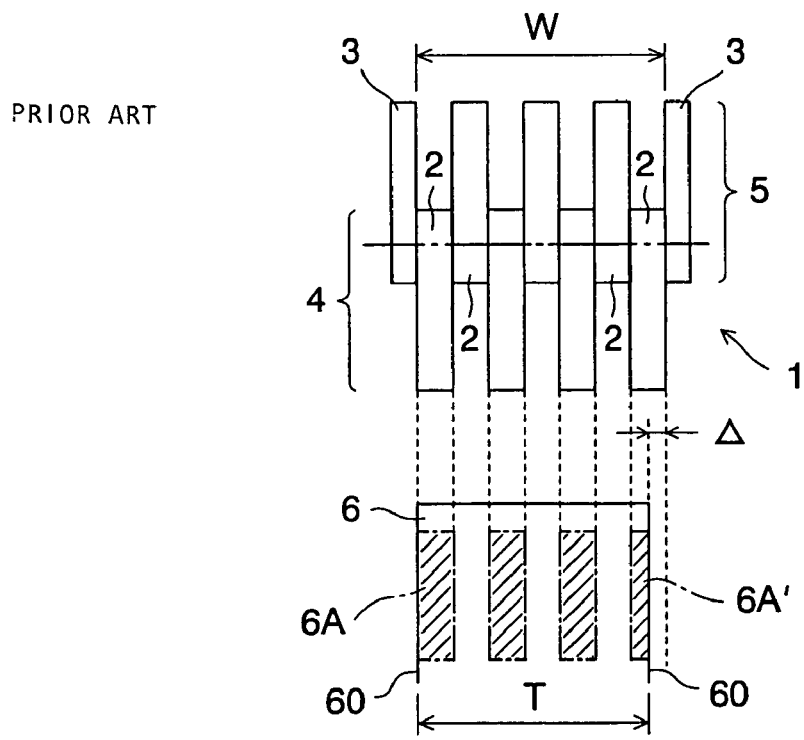
FIG. 5 illustrates an engaging state of a link row of a silent chain with a sprocket tooth in the prior art.

In this case, even when a partial contact occurs, as shown in FIG. 5, on either side of the tooth surface, a partial wear to both surfaces 10a, 10b due to high pressure may be prevented, since both of the side surfaces 10a, 10b of the tooth 11 have a hardness higher than the hardness of the central portion 10c. Furthermore, even when a portion of, or the whole clearance Δ shown in FIG. 5 is allotted on either side of the tooth, both of the outermost link plates 2 of the link row 4 can contact the corresponding side surfaces 10a, 10b, thereby preventing a partial wear to the side surfaces of the tooth surface of the sprocket.

Figure 2:
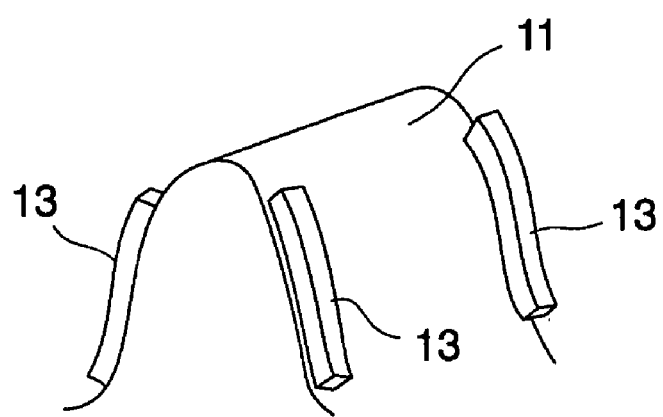
FIG. 2 is a perspective view of a tooth of a sprocket material in use for a rolling process.
Figure 4:
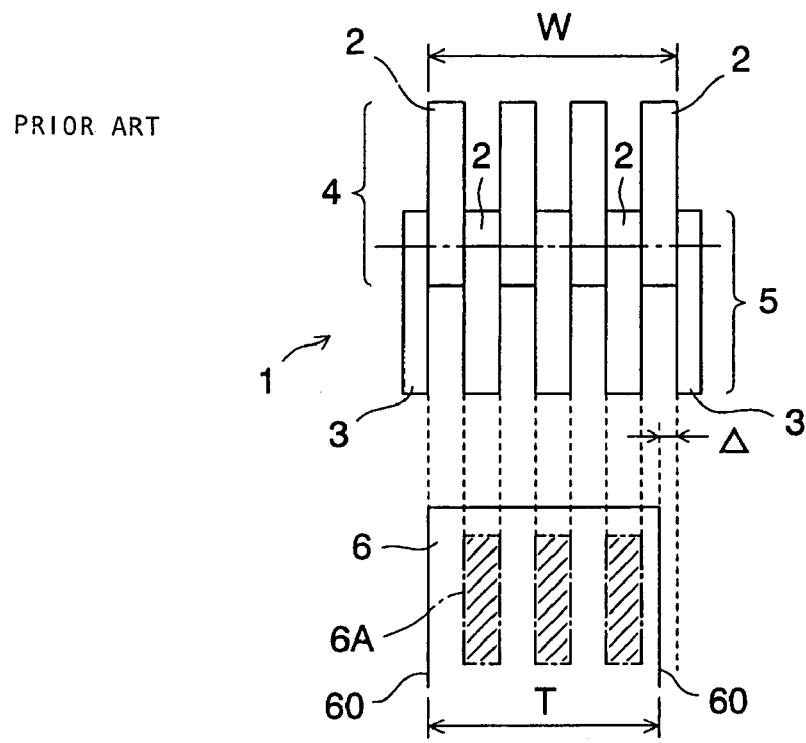
FIG. 4 illustrates an engaging state of a guide row of a silent chain with a sprocket tooth in the prior art.

Rolling, sintering, or induction may make the teeth of the sprocket with opposite sides 10a, 10b of a first hardness and a center portion 10c between the opposite sides of the tooth with a second hardness hardening. In the case of rolling, a sprocket material, shown in FIG. 2, is used that has a pair of protrusions 13 at a position that corresponds to the side portions on the sprocket tooth 11. During the rolling process, as each sprocket tooth surface is compressed by a die, the density of the side portions 10a, 10b on opposite sides of the sprocket tooth 11 becomes greater and the hardness of the side portions 10a, 10b becomes higher than that of the central portion 10c.

In the case of sintering, the side portions 10a, 10b on the sprocket tooth 11 are made using a high-density powder material that has small-sized particles and the central portion 10c is made using a low-density powder material that has large-sized particles. The smaller the particles the greater the hardness. Thereby, after the sintering process, the hardness of each of the side portions 10a, 10b on the sprocket tooth is higher than the hardness of the central portion 10c.

In the case of induction hardening, a heating coil is placed such that the temperature of the side portions 10a, 10b of the tooth are higher than that of the central portion 10c and thus the hardness of the side portions 10a, 10b is made greater than the central portion 10c.

Figure 3:
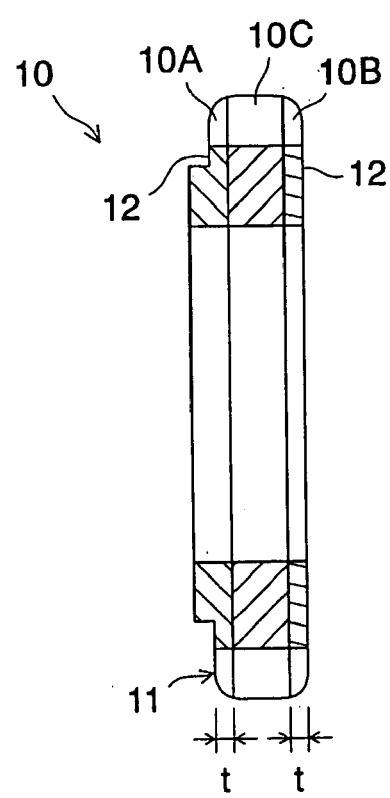
FIG. 3 is a side sectional view of a sprocket for a silent chain according to a second embodiment of the present invention.

FIG. 3 shows a side sectional view of a sprocket for a silent chain according to another embodiment of the present invention. Like reference numbers indicate identical or functionally similar elements. As shown in FIG. 3, a sprocket 10 includes a first and second member 10A, 10B, disposed on opposite sides 12, and a third member 10C interposed between the first and second member 10A, 10B.

Each of the sprocket members 10A, 10B, and 10C is integrated with each other by fixedly attaching and closely contacting each other through fastening elements such as rivets, bolts, or the like. Therefore, each tooth surface of the members 10A, 10B and 10C is integrated to form a tooth surface 11 of a sprocket tooth 10. The hardness of each of the tooth surfaces of the members 10A and 10B is higher than the hardness of the member 10C. The difference in hardness between 10A, 10B and the hardness of 10C is preferably at least 5 units on a Rockwell Hardness scale. Preferably, the thickness t of each of the members 10A, 10B is generally equal to the thickness of an outermost link plate composing a link row of a silent chain.

In this case, even when a partial contact shown in FIG. 5 occurs on either side of a sprocket tooth 11, a partial wear to both sides on the tooth due to high pressure may be prevented, since each of the members 10A, 10B are disposed on opposite sides of a sprocket tooth 11 and have a hardness greater than member 10C, which is centrally disposed on the sprocket tooth. Since the members 10A, 10B and 10C are composed from discrete members, it is easy to provide a difference in hardness between the side portions and the central portion on the sprocket tooth. Furthermore, since each of the members 10A, 10B has a thickness nearly equal to the thickness of an outermost link plate composing link rows, each of the outermost link plates of the link rows 4 always contacts each tooth surface of the corresponding member 10A, 10B, thereby further preventing a partial wear on the both side portions of the sprocket tooth 11.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A sprocket for a silent chain having a plurality of link plates comprising a plurality of teeth around a periphery of the sprocket, each of the plurality of teeth comprising:
   a leading surface and a trailing surface, rotationally opposite the leading surface, each surface comprising side portions of a first hardness on inside edges and outside edges of the surfaces and a central portion between the side portions of a second hardness, less than the first hardness, wherein the side portions on the inside edges and the outside edges of the side surfaces contact the plurality of link plates of the silent chain.

2. The sprocket of claim 1, wherein the silent chain is comprised of interlaced inner links and outer links and wherein each of the side portions has a width approximately equal to a thickness of an outer link plate of the silent chain.

3. The sprocket of claim 1, wherein the sprocket and the plurality of teeth are formed by rolling.

4. The sprocket of claim 1, wherein the sprocket and the plurality of teeth are formed of a sintered alloy and the side portions have a density greater than the central portions of the plurality of teeth.

5. The sprocket of claim 1, wherein the side portions and the central portion of the plurality of teeth are formed of discrete members integrated together.

* * * * *